US009013057B2

(12) United States Patent
Pelaez et al.

(10) Patent No.: US 9,013,057 B2
(45) Date of Patent: Apr. 21, 2015

(54) STARTER CIRCUIT FOR MOTOR VEHICLE

(75) Inventors: Joaquin A. Pelaez, Dublin, OH (US); Brian Reynolds, Plain City, OH (US); Kevin Ireland, Columbus, OH (US); Hiromichi Suzuki, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 923 days.

(21) Appl. No.: 13/158,848

(22) Filed: Jun. 13, 2011

(65) Prior Publication Data

US 2012/0313381 A1 Dec. 13, 2012

(51) Int. Cl.
*B60R 25/04* (2013.01)
*F02N 11/08* (2006.01)

(52) U.S. Cl.
CPC .......... *F02N 11/0862* (2013.01); *F02N 11/087* (2013.01)

(58) Field of Classification Search
USPC .......................................................... 307/10.3
See application file for complete search history.

(56) References Cited

U.S. PATENT DOCUMENTS

| | | | | | |
|---|---|---|---|---|---|
| 5,416,286 | A * | 5/1995 | Dixon, Jr. | 200/16 E |
| 5,818,121 | A | 10/1998 | Krappel et al. | |
| 6,049,140 | A | 4/2000 | Alksnat et al. | |
| 6,087,737 | A | 7/2000 | Alksnat et al. | |
| 6,417,579 | B1 | 7/2002 | Lehnst et al. | |
| 6,597,149 | B1 | 7/2003 | Urlass et al. | |
| 8,706,345 | B2 * | 4/2014 | Bucci et al. | 701/29.6 |
| 2005/0237167 | A1 * | 10/2005 | Hager | 340/426.15 |
| 2008/0151454 | A1 | 6/2008 | Uhl | |
| 2009/0096286 | A1 | 4/2009 | Buck et al. | |
| 2010/0090526 | A1 * | 4/2010 | Itou | 307/10.6 |

* cited by examiner

*Primary Examiner* — Rexford Barnie
*Assistant Examiner* — Dru Parries
(74) *Attorney, Agent, or Firm* — Rankin, Hill & Clark LLP

(57) ABSTRACT

A starter circuit includes a battery, a starter electrically coupled with the battery, a relay disposed between the battery and the starter, and a starter switch mounted remotely from the starter. The starter includes a switch assembly and a starter motor. The switch assembly includes an actuator and a start signal switch. The relay is configured to operate to provide current to the switch assembly to close the start signal switch in response to a received signal. The starter switch closes in response to the start signal switch being closed, whereby the battery delivers current to the starter motor when the starter switch is closed. A starter unit is also disclosed.

14 Claims, 2 Drawing Sheets

STARTER CIRCUIT FOR MOTOR VEHICLE

BACKGROUND

This disclosure relates to a starter circuit in a motor vehicle. With reference to FIG. 1, a known starter circuit 10 for a vehicle engine includes a battery 12 that provides current to a starter unit 14 via a high-current starter cable 16. The starter unit 14 is mounted in an engine bay (not shown) typically on the engine (not shown) of the vehicle (not shown) that includes the starter circuit 10. The starter unit 14 includes a solenoid switch assembly 18 and a starter motor 22. The solenoid switch assembly 18 includes a solenoid 24 that is energized when an S-terminal 26 receives current from the battery 12. The S-terminal 26 only receives current from the battery 12 when a signal is received, which closes a relay 28. The signal, which can also be referred to as an STS signal 32, is generated in response to an operator performing an operation, e.g. turning a key in an ignition lock (not shown). The solenoid 24 pulls a pinion 34 to close a starter switch 36. With the starter switch 36 closed, the starter motor 22 is energized, i.e. receives current from the battery 12, and cranking of the starter motor begins.

The starter unit 14 includes a B terminal 38 that is not switched with respect to the battery 12. When the starter switch 36 is closed, the B terminal 38 connects with an M terminal 42, which is connected with the starter motor 22. If the high-current starter cable 16 connecting the battery 12 to the B terminal 38 is cut by a metallic piece in the engine bay, for example during a vehicle frontal crash event, the high-current starter cable 16 can be grounded to the vehicle body or the engine, which is undesirable.

SUMMARY

An example of a starter circuit that can overcome at least some of the aforementioned shortcomings includes a battery, a starter electrically coupled with the battery, a relay disposed between the battery and the starter, and a starter switch mounted remotely from the starter. The starter includes a switch assembly and a starter motor. The switch assembly includes an actuator and a start signal switch. The relay is configured to operate to provide current to the switch assembly to close the start signal switch in response to a received signal. The starter switch closes in response to the start signal switch being closed, whereby the battery delivers current to the starter motor when the starter switch is closed.

An example of another motor vehicle starter circuit that can overcome at least some of the aforementioned shortcomings includes a battery, a relay connected with the battery, a start signal switch electrically coupled with the battery, a starter switch electrically coupled with the battery and the start signal switch, and a starter motor electrically coupled with the starter switch. The start signal switch is configured to generate a start signal in response to a signal received from the relay. The starter switch is configured to close in response to receiving the start signal from the start signal switch. The starter motor receives electrical current from the battery when the starter switch is closed.

An example of a starter unit that can overcome at least some of the aforementioned shortcoming includes a solenoid, a switch actuated by the solenoid, a first terminal electrically coupled to the solenoid and the switch, a starter motor, a second terminal electrically coupled to the switch, and a third terminal electrically coupled to the starter motor. Electrical current passes through the first terminal to energize the solenoid to actuate the switch. Electrical current also passes through the first terminal toward the switch. When the switch is closed, electrical current flows from the first terminal to the second terminal. The third terminal is for receiving electrical current to operate the starter motor.

DETAILED DESCRIPTION

Figure 2:
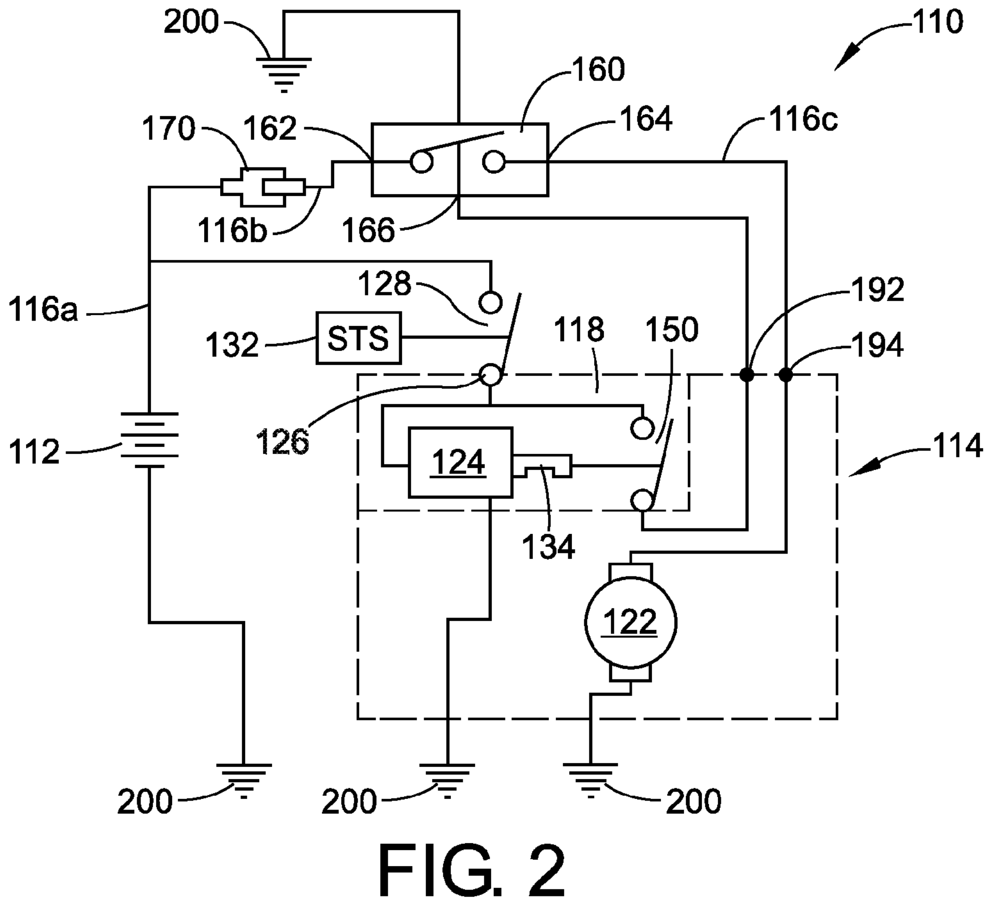
FIG. 2 is a schematic depiction of another motor vehicle starter circuit.

With reference to FIG. 2, a starter circuit 110 includes a battery 112 and a starter 114, which can also be referred to as a starter unit, electrically coupled with the battery via a high-current starter line, which as depicted in FIG. 2 includes a plurality of cables 116*a*, 116*b*, 116*c*. The starter 114 can mount in an engine bay (not shown) of a vehicle (not shown) that includes the starter circuit 110. The starter 114 includes a switch assembly 118 and a starter motor 122. The switch assembly 118 includes an actuator, which in the illustrated embodiment is a solenoid 124 that is energized when a first terminal 126 of the starter 114 receives current from the battery 112. The first terminal 126 receives current from the battery 112 when a signal is received, which closes a relay 128. The signal, which can also be referred to as an STS signal 132, is generated in response to an operator performing an operation, e.g. turning a key in an ignition lock, pressing a START button located in the vehicle cabin, or another operation that is typically performed when an operator wishes to start the vehicle's engine. The switch assembly 118 also includes a start signal switch 150. In response to receiving current from the first terminal 126, the solenoid 124 pulls a pinion 134 to close the start signal switch 150.

The relay 128 is disposed between the battery 112 and the starter 114. The relay 128 is configured to operate to provide current to the switch assembly 118 to close the start signal switch 150 in response to the received signal, e.g. the STS signal 132. Where the actuator is a solenoid 124, which is illustrated in FIG. 2, the relay 128 is configured to selectively supply current to the solenoid to close the start signal switch 150.

The start signal switch 150 is electrically coupled with the battery 112. The start signal switch 150 is configured to generate a start signal in response to a signal, e.g., the STS signal 132, received from the relay 128.

The starter circuit 110 also includes a starter switch 160, which is similar to the starter circuit 10 described above; however, the starter switch 160 is mounted remotely from the starter 114. In contrast to the starter circuit 10 depicted in FIG. 1, where the starter switch 36 is located in the starter 14, which typically mounts to the engine of the vehicle, the starter switch 160 is not found in the starter 114 and the starter switch 160 is not mounted on the vehicle engine (not shown). Instead, the starter switch 160 is spaced from the engine.

Figure 3:
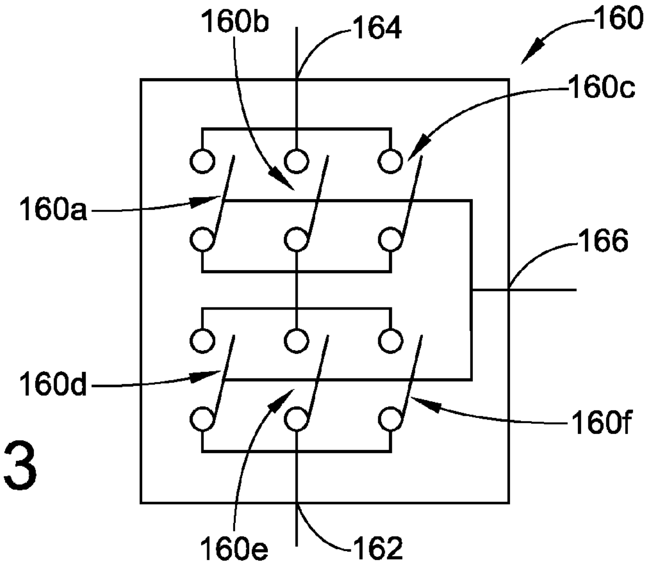
FIG. 3 is a schematic depiction of a starter switch found in the motor vehicle starter circuit depicted in FIG. 2.

The starter switch 160 depicted in FIG. 2 can be a solid state switch unit. With reference to FIG. 3, the starter switch includes a plurality of individual solid state switches 160*a*, 160*b*, 160*c*, 160*d*, 160*e*, 160*f*. By providing a plurality of individual solid state switches 160*a*-160*f*, overloading of individual switches can be avoided. Also, providing a plurality of individual solid state switches 160*a*-160*f* provides redundancy to the starter switch 160 to prevent individual switch failure, which could defeat the function of the starter switch.

With reference back to FIG. 2, the starter switch 160 includes an input terminal 162 for connecting the starter switch with the battery 112, an output terminal 164 for connecting the starter switch with the starter 114 and the starter motor 122, and an input signal terminal 166 for receiving a start signal from the start signal switch 150. The starter switch 160 closes in response to receiving the start signal from the start signal switch 150. With the starter switch 160 closed, the battery 112 can deliver current to the starter 114 through the starter switch via the high-current starter line 116*a*, 116*b*, 116*c*.

Figure 1:
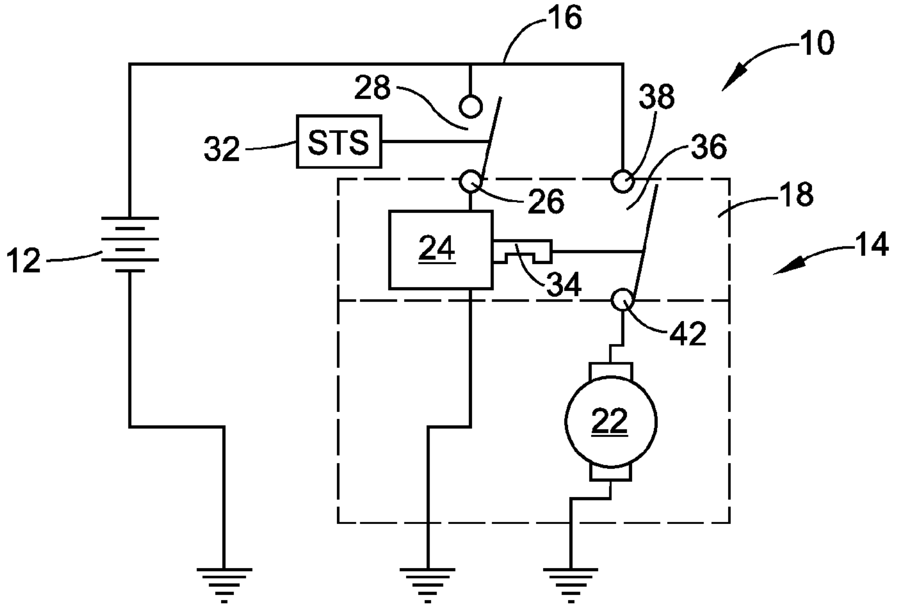
FIG. 1 (PRIOR ART)
FIG. 1 is a schematic depiction of a known motor vehicle starter circuit.

The starter circuit 110 also includes a mechanical disconnect 170, which in the embodiment illustrated in FIG. 1, connects a first cable 116*a* of the starter line to a second cable 116*b* of the starter line. In the embodiment depicted in FIG. 1, the mechanical disconnect 170 is disposed on the starter cable line 116*a*, 116*b*, 116*c* between the battery 112 and the starter 114, as well as the starter motor 122. The mechanical disconnect 170 is configured to selectively disconnect at least one cable, e.g. cables 116*a*, 116*b*, 116*c* connecting the battery 112 to the starter 114 or starter motor 122, in response to a crash event.

Figure 4A:
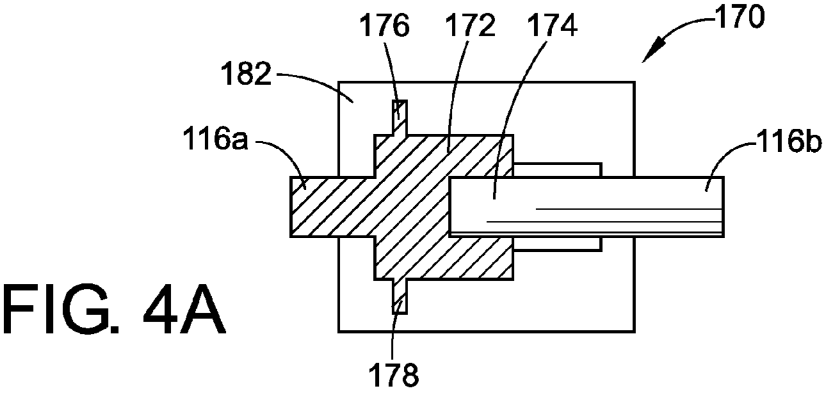
FIGS. 4A-4C are schematic depictions of a mechanical disconnect in the motor vehicle starter circuit depicted in FIG. 2.
Figure 4B:
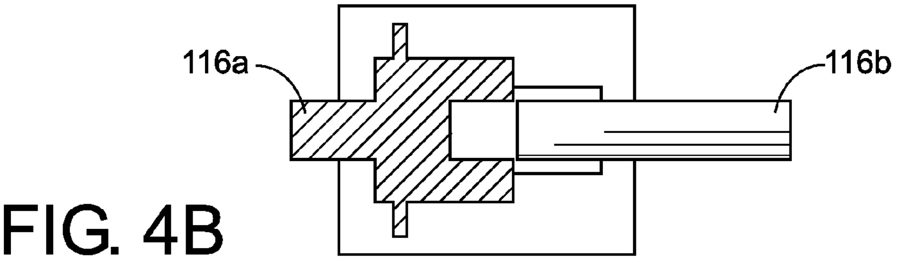
Figure 4C:
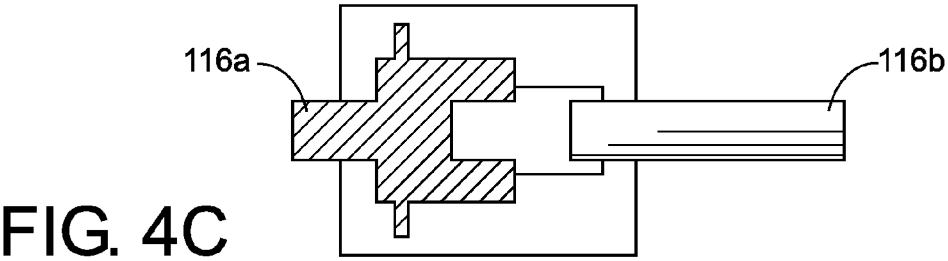

With reference to FIGS. 4A-4C, the second cable 116*b* is movable with respect to the first cable 116*a*, or vice versa, at the mechanical disconnect 170. The mechanical disconnect allows for disconnecting the first cable 116*a* from the second cable 116*b* to preclude electrical current from passing from the battery 112 (FIG. 1) toward the starter 114 (FIG. 1) when the first cable is disconnected from the second cable. In the embodiment illustrated in FIGS. 4A-4C, the first cable 116*a* includes a female receptacle 172 that receives a male end 174 of the second cable 116*b*. The first cable 116*a* also includes a flange 176 received in a cut out 178 formed in a housing 182, which fixes the female receptacle 172 in the housing and precludes axial movement of the female receptacle with respect to the housing. Accordingly, FIGS. 4A-4C depict the second cable 116*b* as movable with respect to the first cable 116*a*, however, the male end and female receptacle can be reversed to allow the first cable to move with respect to the second cable. Moreover, other mechanical and electrical connections can be used to connect the first cable 116*a* with the second cable 116*b*, however, such alternative connections should allow the first cable to mechanically disconnect from the second cable.

As mentioned above, the mechanical disconnect 170 includes the housing 182. The housing 182 receives the first cable 116*a*, e.g., the female receptacle 172 thereof, and the second cable 116*b*, e.g., the male end 174 thereof. The housing 182 can include a material configured to suppress a spark created when the first cable 116*a* disconnects from the second cable 116*b*. The material configured to suppress the spark can be an EPDM rubber. With reference to FIG. 4B, when the first cable 116*a* is about to disconnect from the second cable 116*b*, a spark can form at the junction of the first cable and the second cable. The material from which the housing 182, or which the housing includes, can be any suitable known material that can suppress such a spark made when a 12 volt or 18 volt battery is disconnected from a cable by way of a rapid mechanical disconnection.

With reference back to FIG. 2, the starter switch 160 is shown as connected with the second starter cable 116*b* and the third starter cable 116*c*, between the mechanical disconnect 170 and the starter 114. If desired, the starter switch 160 can connect with the high current starter line 116*a*, 116*b*, 116*c* between the battery 112 and the mechanical disconnect 170.

With continued reference to FIG. 2, the starter circuit 110 further includes a start signal cable 190, which can be a low-current cable, electrically coupling the starter 114 to the starter switch 160. The start signal cable 190 connects to the input signal terminal 166 on the starter switch 160 and to a second terminal 192 on the starter 114 that is electrically coupled to the start signal switch 150. As mentioned above, the start signal switch 150 delivers a start signal to the starter switch 160. The start signal is delivered over the start signal cable 190. When the start signal switch 150 is closed, electrical current flows from the first terminal 126 of the starter 114 to the second terminal 192, and this current can provide the start signal to the starter switch 160.

The starter 114, which can also be referred to as a starter unit, differs from the starter 14 disclosed in FIG. 1 in at least one aspect. The starter 114 includes the solenoid 124 and the switch, i.e. the start signal switch 150, actuated by the solenoid. The starter 114 also includes the first terminal 126 electrically coupled to the solenoid 124; however, the first terminal 126 is also electrically coupled to the starter switch 150. Electrical current passes through the first terminal 126 to energize the solenoid 124 to actuate the start signal switch 150. Electrical current also passes through the first terminal 126 toward the start signal switch 150, which differs from the starter 14 depicted in FIG. 1. The starter 114 also includes the starter motor 122. The starter 114 also includes the second terminal 192 and a third terminal 194. As mentioned above, the second terminal 192 is electrically coupled to the start signal switch 150. When the start signal switch 150 is closed, electrical current flows from the first terminal 126 of the starter 114 to the second terminal 192. The third terminal 194 is electrically coupled to the starter motor 114 for receiving electrical current to operate the starter motor. The third terminal 194 is also electrically coupled to the starter switch 160 via the third starter cable 116*c*, which is received in the output terminal 164 of the starter switch. As is apparent when comparing FIG. 1 to FIG. 2, the starter 114 is void of a live B terminal high-current connection that is not switched to battery 112, which differs from the starter motor 14 depicted in FIG. 1.

To begin cranking the starter motor 122, a signal, e.g., the STS signal 132, is sent, which can be generated in response to an operator turning a key in an ignition lock as well as in response to another operation performed by an operator to signify that the operator would like the engine (not shown) of the vehicle to start. Upon receiving the STS signal 132, the relay 128 closes, which allows current to pass from the battery 112 to the first terminal 126 of the starter 114. Current passing through the first terminal 126 energizes the solenoid 124 to close the start signal switch 150. With the start signal switch 150 closed, current also passes through the start signal switch 150 from the first terminal 126 to the second terminal 192. Current passing through the second terminal 192 passes through the start signal cable 190, which connects to the input signal terminal 166 on the starter switch 160. This can deliver a start signal to the starter switch 160, which closes the starter switch. With the starter switch 160 closed, and the first cable 116*a* not disconnected from the second cable 116*b* at the mechanical disconnect 170, current flows from the battery 112 to the third terminal 194 of the starter 114 through the cables 116*a*, 116*b*, 116*c*, which can be high-current cables. Current passes through the third terminal 194 of the starter 114 and the starter motor 22 is energized, e.g. receives current from the battery 112, and cranking of the starter motor begins. As is apparent in FIG. 1, the battery 112, the starter motor 122, the solenoid 124 and the starter switch 160 are connected to ground 200.

A motor vehicle starter circuit and a starter unit for a vehicle have been described above with reference to the illustrated embodiments. The appended claims, however, are not limited to only the embodiments described above. It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A motor vehicle starter circuit comprising:

a battery;

a starter electrically coupled with the battery and including a switch assembly and a starter motor, the switch assembly including an actuator and a start signal switch;

a relay disposed between the battery and the starter, the relay being configured to operate to provide current to the switch assembly to close the start signal switch in response to a received signal;

a starter switch mounted remotely from the starter that closes in response to the start signal switch being closed, whereby the battery delivers current to the starter motor when the starter switch is closed, wherein the actuator is a solenoid, wherein the relay is configured to selectively supply current to the solenoid through a first terminal, which includes only a single input path, to close the start signal switch, and electrical current passes through the first terminal toward the start signal switch.

2. The starter circuit of claim 1, wherein the starter switch is a solid state switch unit.

3. The starter circuit of claim 1, wherein the starter switch includes a plurality of solid state switches.

4. The starter circuit of claim 1, wherein the starter switch includes an input terminal for connecting the starter switch with the battery, an output terminal for connecting the starter switch with the starter and an input signal terminal for receiving a start signal from the start signal switch.

5. The starter circuit of claim 4, wherein the starter switch closes in response to receiving the start signal from the start signal switch.

6. The starter circuit of claim 1, further comprising:

at least one starter cable connecting the battery to the starter; and a mechanical disconnect connecting a first cable of the at least one starter cable to a second cable of the at least one starter cable, wherein the second cable is movable with respect to the first cable, or vice versa, at the mechanical disconnect for disconnecting the first cable from the second cable to preclude electrical current from passing from the battery toward the starter when the first cable is disconnected from the second cable.

7. The starter circuit of claim 6, wherein the mechanical disconnect includes a housing that receives the first cable and the second cable, wherein the housing includes a material configured to suppress a spark created when the first cable disconnects from the second cable.

8. The starter circuit of claim 7, wherein the material configured to suppress a spark is EPDM rubber.

9. The starter circuit of claim 6, wherein the starter switch is connected with the at least one starter cable between the mechanical disconnect and the starter.

10. The starter circuit of claim 1, further comprising a start signal cable electrically coupling the starter to the starter switch.

11. The starter circuit of claim 10, wherein the starter switch includes an input terminal for connecting the starter switch with the battery, an output terminal for connecting the starter switch with the starter and an input signal terminal for receiving a signal from the start signal switch, wherein the start signal cable connects to the input signal terminal.

12. A starter circuit for a vehicle comprising:

a solenoid;

a start signal switch actuated by the solenoid;

a first terminal, which includes only a single input path, electrically coupled to the solenoid and the start signal switch, wherein electrical current passes through the first terminal to energize the solenoid to actuate the start signal switch, wherein electrical current passes through the first terminal toward the start signal switch;

a starter motor;

a second terminal electrically coupled to the start signal switch, wherein when the start signal switch is closed electrical current flows from the first terminal to the second terminal;

a third terminal electrically coupled to the starter motor for receiving electrical current to operate the starter motor;

a starter switch remotely mounted from the starter unit; and a high-current cable electrically coupling the third terminal to the starter switch.

13. The starter circuit of claim 12, further comprising a low-current cable electrically coupling the second terminal to the starter switch, wherein the starter switch is configured to close in response to a start signal being delivered from the start signal switch to the starter switch.

14. The starter circuit of claim 13, further comprising a battery electrically coupled with the starter switch, wherein electrical current is delivered through the starter switch to the third terminal when the starter switch is closed.

* * * * *